May 21, 1929.  S. RUBEN  1,714,191
ELECTRICAL CONDENSER
Filed Dec. 22, 1926
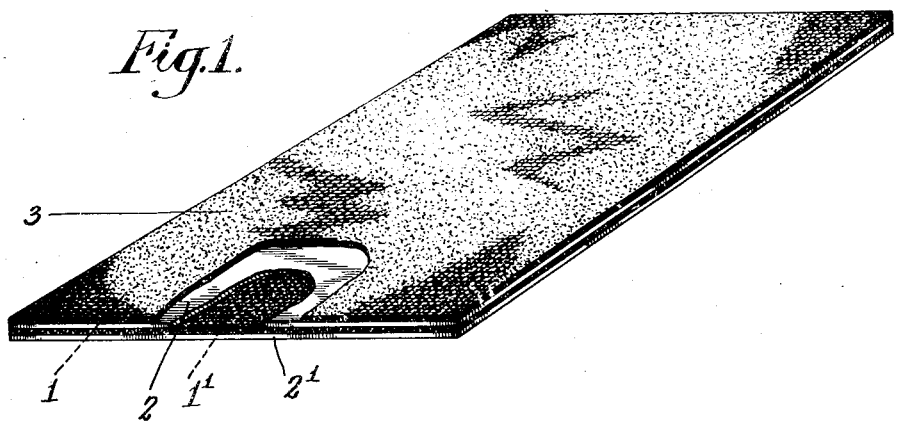
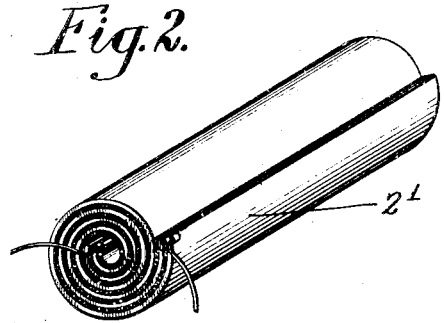
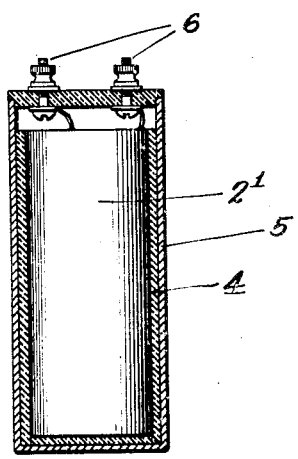
Inventor
SAMUEL RUBEN
By his Attorney

Patented May 21, 1929.

1,714,191

UNITED STATES PATENT OFFICE.

SAMUEL RUBEN, OF NEW YORK, N. Y.

ELECTRICAL CONDENSER.

Application filed December 22, 1926. Serial No. 156,308.

This invention relates to electrostatic condensers, and it relates more particularly to electrical condensers of the electrolytic type.

According to the terms of my invention the device consists of film-forming electrodes separated by an electrolyte composed of an hygroscopic material with a small percentage of a stabilizing solution and a neutral or slightly alkaline salt in suspension with said stabilizing solution and said hygroscopic material and held in a fixed paste like density and concentration by an insulating gauze like textile, and suitable pressure applied to maintain close surface contact between the electrolyte and the electrodes.

For the electrode material I prefer thin aluminum sheets having an oxide film formed upon the surfaces before assembly, and as the electrolyte, glycerine having a relatively small amount of water and having mixed therewith suspended powdered sodium bicarbonate, a small percentage of boric acid being present to stabilize the paste which has a sodium borate content due to reaction of the boric acid with the sodium bicarbonate and to increase the conductivity of the mixture. In absorbing from the atmosphere sufficient moisture to maintain the desired conductivity, the ionic conductivity of the condensers is held constant. This condenser combines the advantages of the aluminum oxide film type with that of the colloidal charge type, without the inherent leakage of the latter and the drying out of the electrolytic element of the former.

The preferred method of assembling the elements of this device is to apply the paste-like electrolyte mixture to a sheet of gauze spread over the oxide surface of the aluminum sheets, the electrolyte being then in the form of a layer about 1/16 inch in thickness. Over this should be placed the other electrode element, and the whole compressed for complete contact. If the elements are to be coiled another layer of the gauze and the paste electrolyte should be applied so as to keep the electrodes separated. The electrolyte permeates the gauze and fills the interstices establishing a layer over its entire area. "Forming" the electrodes, or coating the surfaces with aluminum oxide may be accomplished by connecting the sheets as the anodes in circuits in a bath of ammonium sulphate, the oxide serving to maintain the leakage at a low value.

With such a combination having a total surface anode area of 200 square inches, the condenser has a capacity of 1000 microfarads, with a leakage of about 2 milliamperes at 10 volts, which for commercial purposes is negligible. From the standpoint of material cost aluminum electrodes are preferable; but the device gives more efficient results if the electrodes are magnesium with which, however, an electrolyte of powdered potassium fluoride and glycerine and a small percentage of calcium hydroxide should be used. The lower resistance of the electrolyte promotes the efficiency of the combination. But for commercial use, aluminum electrodes with the electrolyte of glycerine, boric acid and sodium bicarbonate are considered most suitable.

For use with low voltage alternating current at potentials less than the decomposition potential of the electrolyte for electrodes with capacitance effects, other materials, such as lead, may be employed. But for direct current application and high voltage alternating current, as for filter circuit use, the leakage due to those materials is prohibitively excessive. The electrolytic film capacitance effects when aluminum electrodes are used, reduce leakage and permit universal application.

Reference is made to the accompanying drawings showing embodiments of the invention, in which, Fig. 1 is illustrative of a flat plate condenser, cut away in part to show the interposed electrolyte and gauze; Fig. 2 shows the device in coiled form and Fig. 3, a section view of the latter.

Referring particularly to Fig. 1, 1 and $1^1$ represent the gauze carrier for the electrolyte 3, and 2 and $2^1$ the aluminum electrodes. In Fig. 3, 4 represents an insulating cover between the outer aluminum electrode and the wall of the metal container; at 6 are the condenser terminals.

What I claim is:

1. An electrical condenser comprising film-forming electrodes separated by an electrolyte mixture composed of an hygroscopic material and sodium bicarbonate with an acidic stabilizing compound.

2. An electrical condenser comprising film-forming electrodes and an electrolyte mixture having therein glycerine, sodium bicarbonate and boric acid.

3. An electrical condenser having aluminum electrodes coated with aluminum oxide, and an electrolyte mixture having therein glycerine, boric acid and sodium bicarbonate covering a dielectric wide meshed cloth material interposed between the electrodes.

4. An electrical condenser comprising film forming electrodes separated by a paste electrolyte comprising a mixture of an hygroscopic and viscous material and a neutral salt, said material to afford a paste like mixture with said neutral salt and to maintain the water content of the electrolyte substantially at its initial value, said electrolyte being substantially the sole vehicle for electrical conduction.

5. An electrical condenser comprising film forming electrodes separated by an electrolyte in paste form comprising as sole vehicle for electrical conduction a mixture of a neutral salt, an acidic stabilizing compound and a material combining hygroscopicity and viscosity to afford a plastic mixture with said neutral salt and compound and to maintain the water content of the electrolyte substantially at its initial value.

6. An electrolyte condenser having film forming electrodes and an electrolyte mixture in paste form comprising as sole vehicle for electrical conduction a neutral salt, an acidic stabilizing compound and a material combining hygroscopicity and viscosity to afford plasticity with said neutral salt and compound and to maintain the water content of the electrolyte mixture substantially at its initial value, said electrolyte mixture permeating a dielectric wide meshed cloth, interposed between the electrodes and acting as a base to hold said electrolyte in proper form between the electrodes.

7. An electrolytic condenser, comprising spaced film-forming electrodes, a porous spacer and a viscid electrolyte mixture between the plates, said mixture comprising a viscous material and an electrolyte, said viscous material serving as a carrier medium for said electrolyte and said viscous material and said spacer both serving to keep the mixture between the electrodes.

In testimony whereof, SAMUEL RUBEN has signed his name to this specification, this 20th day of December 1926.

SAMUEL RUBEN.